United States Patent [19]
Gillen et al.

[11] Patent Number: 5,999,768
[45] Date of Patent: Dec. 7, 1999

[54] THERMAL SENSOR ASSEMBLY

[75] Inventors: John Gillen; Robert Casper, both of Spokane, Wash.

[73] Assignee: Output Technology Corporation, Spokane, Wash.

[21] Appl. No.: 09/325,519

[22] Filed: Jun. 3, 1999

Related U.S. Application Data

[62] Division of application No. 08/953,909, Oct. 20, 1997.

[51] Int. Cl.[6] .............................. G01K 1/14; G01J 5/08; G03G 15/20; G03G 21/20
[52] U.S. Cl. ............................... 399/92; 399/94; 399/69; 374/121; 374/153
[58] Field of Search ................................. 274/121, 125, 274/130, 132, 153

[56] References Cited

U.S. PATENT DOCUMENTS

| | | | |
|---|---|---|---|
| 3,690,176 | 9/1972 | Connolly et al. ......................... | 73/351 |
| 4,634,294 | 1/1987 | Christol et al. ......................... | 374/129 |
| 4,977,431 | 12/1990 | Fuji ......................................... | 355/289 |
| 4,986,672 | 1/1991 | Beynon .................................... | 374/131 |
| 5,056,929 | 10/1991 | Watanabe et al. ...................... | 374/181 |
| 5,171,733 | 12/1992 | Hu ............................................ | 250/336 |
| 5,274,423 | 12/1993 | Kusumoto ............................... | 355/208 |
| 5,276,482 | 1/1994 | Nakanishi ............................... | 355/208 |
| 5,287,155 | 2/1994 | Arai et al. ............................... | 355/285 |
| 5,293,877 | 3/1994 | O'Hara et al. .......................... | 374/129 |
| 5,315,350 | 5/1994 | Hirobe et al. ........................... | 355/208 |
| 5,366,291 | 11/1994 | Nakagama et al. ..................... | 374/153 |

*Primary Examiner*—Christopher W. Fulton
*Assistant Examiner*—Maria Fernandez
*Attorney, Agent, or Firm*—Wells, St. John, Roberts, Gregory & Matkin, P.S.

[57] ABSTRACT

An infrared thermal sensor assembly for sensing the temperature of a target, the sensor assembly including a heat sink having a bore therethrough; a thermopile housed in the bore; and a heater operative to heat the heat sink.

12 Claims, 6 Drawing Sheets

THERMAL SENSOR ASSEMBLY

CROSS REFERENCE TO RELATED APPLICATION

This is a Division of U.S. patent application Ser. No. 08/953,909, filed Oct. 20, 1997, and titled "Thermal Sensor Assembly".

TECHNICAL FIELD

The invention relates to thermal sensors.

BACKGROUND OF THE INVENTION

Measurement of surface temperatures of an object using the object's radiated long wave infrared spectrum known in the art.

Physical equations describing the basic process include a Radiated Emittance equation, and a Spectral Radiant Emittance equation.

The equation for Radiated Emittance, in Watts per square centimeter is as follows:

$$W = \epsilon \sigma (T_s^4 - T_b^4)$$

where $\epsilon$ is Emissivity (efficiency of radiation);

$\sigma$ is Boltzman's constant;

$T_s$ is the Temperature of the object in Kelvin; and $T_b$ is the Temperature of the background.

The equation for Spectral Radiant Emittance, in watts per unit area at a particular wavelength, is as follows:

$$W_{80} = C_1 / (\lambda^5 (e^{C2/\lambda T} - 1))$$

where $\lambda$ is Wavelength in microns;

C1 and C2 are Radiation Constants; and

T is Temperature of the heat source/target in Kelvin.

The surface temperature of a target object is therefore proportional to the fourth power of its temperature and inversely proportional to its wavelength. A suitable temperature sensing device should be the most sensitive to the wavelengths including the expected temperature of the target. The temperature sensing device ideally will provide either a voltage or current that is proportional to the radiated energy W.

When selecting a temperature sensor for use in a product, the normal range of temperatures to which the temperature sensor will operate is often known. The inventor has sought to design a temperature sensor which will operate in with a target having a temperature in the range of approximately 10 to 140 degrees Celsius.

Using the spectral radiant Emittance equation, the inventor has determined that the majority of the energy for this temperature range lies in the wavelengths between 3 and 20 microns. A graph of the radiant energy distribution is shown in FIG. 1.

There are a number of types of infrared sensing devices. These include pyroelectric detectors, cryogenic photovoltaic sensors, semiconductor junctions and infrared thermocouples. While pyroelectric devices are very sensitive in this temperature range, they are transient detectors, requiring an expensive mechanical chopper to look at a constant temperature target. They also have a very slow response time. Cryogenic devices are fast and very sensitive but require very expensive coolers to reach their 77–100 Kelvin operating ranges. Semiconductor devices are fast and inexpensive, but have a very narrow range of sensitivity around 0.8 microns, outside the desired range.

SUMMARY OF THE INVENTION

The invention provides an infrared thermal sensor assembly for sensing the temperature of a target, the sensor assembly including a thermopile operated in an isothermal manner.

One aspect of the invention provides an infrared thermal sensor assembly for sensing the temperature of the target, the sensor assembly including a heat sink having a bore therethrough; a thermopile housed in the bore; and a heater operative to heat the heat sink.

In one aspect of the invention, the infrared thermal sensor assembly further comprises a temperature probe sensing the temperature of the heat sink, and circuitry responsive to the temperature probe to control the temperature of the heat sink, wherein the heater is configured to heat the heat sink in response to having power applied thereto, the circuitry responsive to the temperature probe including a phase compensator to compensate for delay between applying power to the heater and resulting temperature change of the heat sink indicated by the temperature probe.

One aspect of the invention provides an infrared thermal sensor assembly for sensing the temperature of a target, the sensor assembly including a housing having an opening therethrough; a circuit board supported by the housing; a heat sink supported by the circuit board, the heat sink having opposite ends and having a bore therethrough between the opposite ends; a thermopile housed in the bore and facing the opening in the housing;

a first heater element supported by the circuit board, proximate one of the ends of the heat sink, and operative to heat the heat sink; a second heater element supported by the circuit board, proximate another of the ends of the heat sink, and configured to heat the heat sink; and a fan supported by the circuit board and configured to direct gas into the housing, and out of the housing through the opening.

One aspect of the invention provides a contactless method of detecting temperature of a heated printer roll, the method including supporting an infrared sensing thermopile in temperature sensing relation to the heated printer roll, spaced apart from the printer roll; and maintaining the temperature of the thermopile at a steady temperature despite transmission of heat from the printer roll towards the thermopile.

One aspect of the invention provides an electrostatic printer including a frame; a pressure drum supported by the frame for rotation about a first axis; an image drum supported by the frame for rotation about a second axis parallel to the first axis; a fusing drum supported by the frame for rotation about a third axis parallel to the first axis, the fusing drum being in contact with the image drum and counter-rotating against the image drum, the pressure drum being in contact with the fusing drum and counter-rotating against the fusing drum to define a nip; a support member supported by the frame and configured to direct a continuous printable media to the nip; a toner dispensing assembly supported by the frame and disposed to dispense toner to the image drum; an image forming assembly operating on toner dispensed on the image drum to form an image, the image being transferred to the fusing drum; a heating assembly heating the fusing drum; and an infrared thermal sensor assembly disposed to sense the temperature of one of the drums, the sensor assembly including a thermopile, and a thermal control element, separate from the drums, affecting the temperature of the thermopile.

BRIEF DESCRIPTION OF THE VIEWS OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
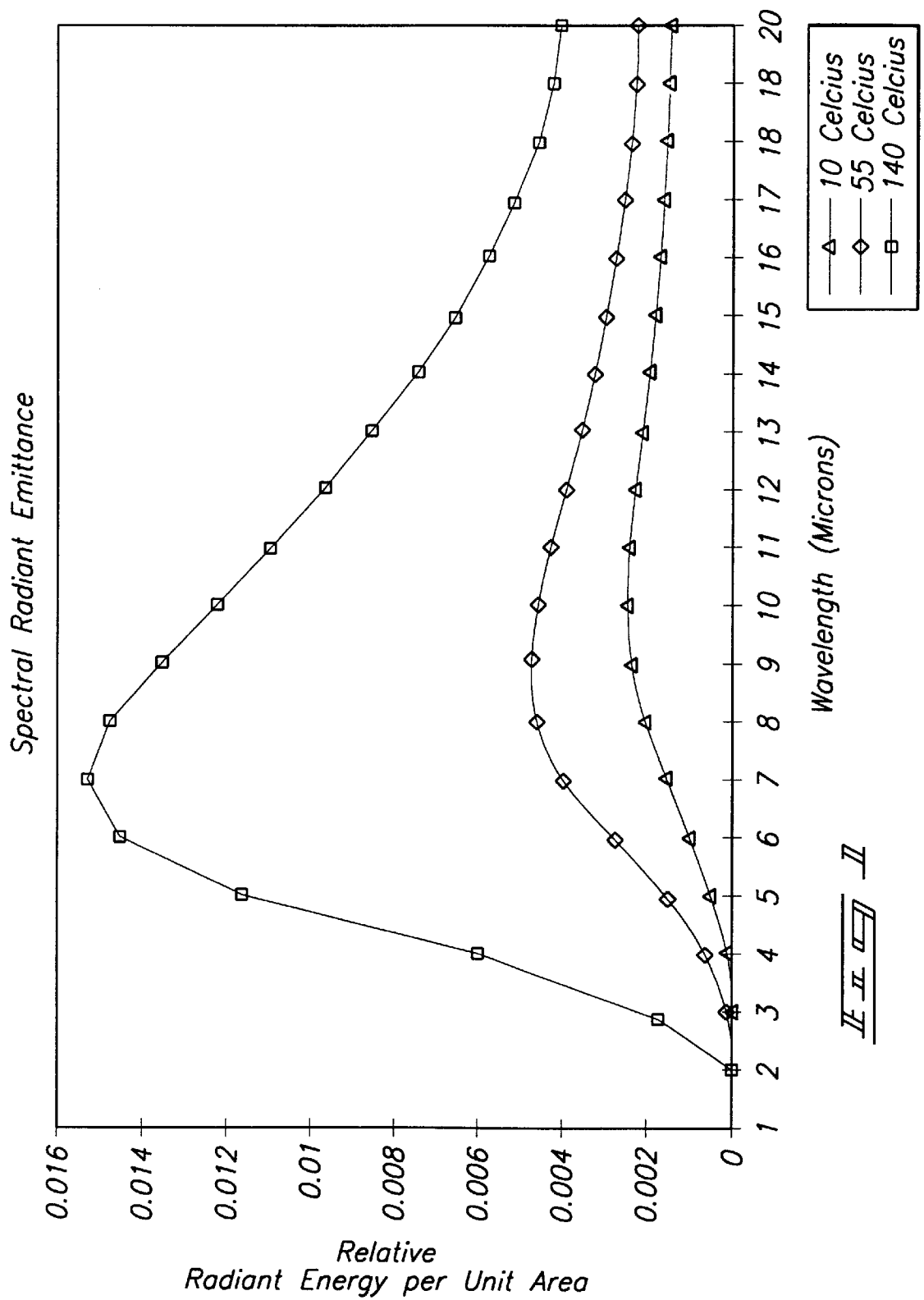
FIG. 1 is a plot of wavelength versus relative radiant energy per unit area.
Figure 2:
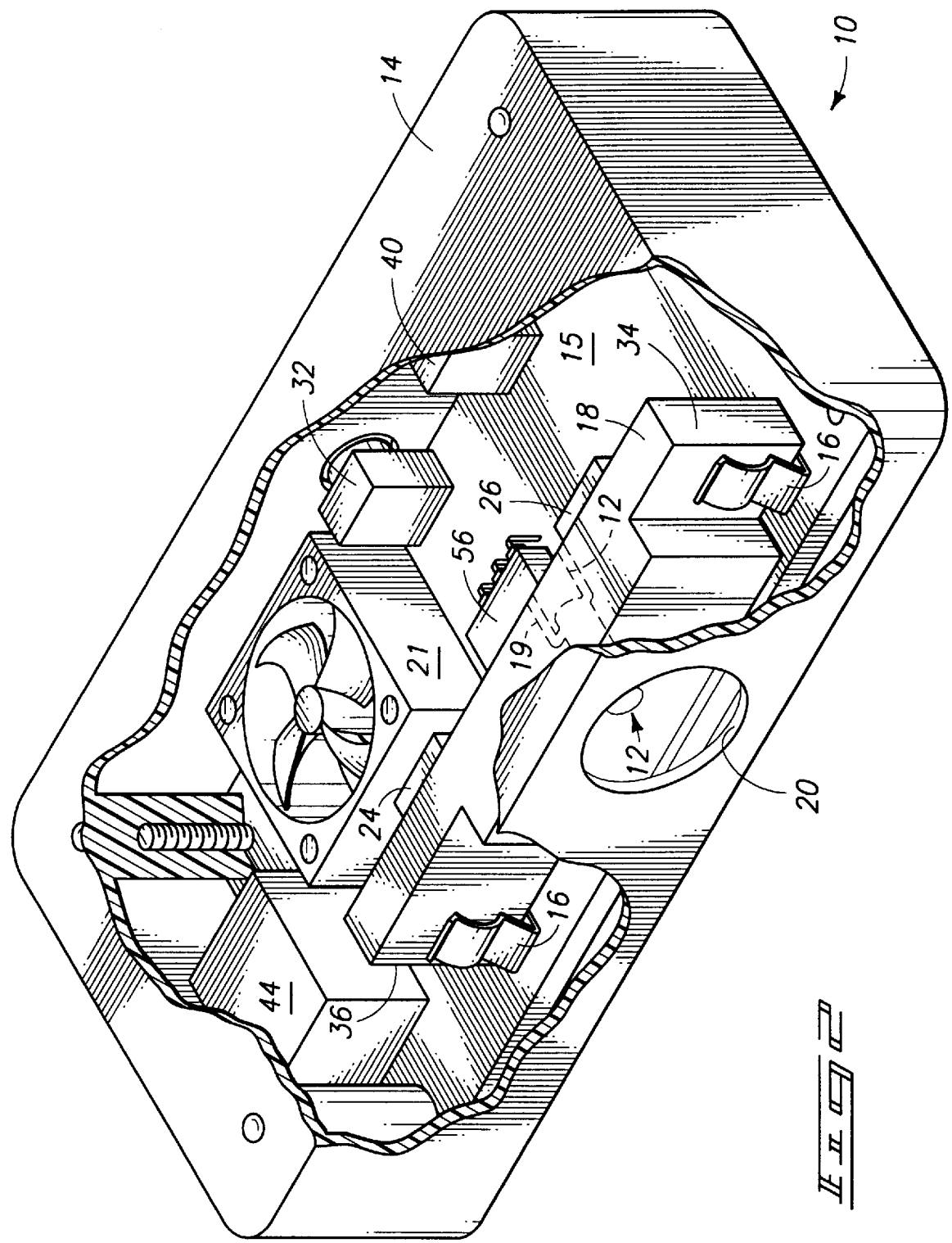
FIG. 2 is a perspective view of a thermal sensor assembly in accordance with the invention.

FIG. 2 shows a thermal sensor assembly 10. The thermal sensor assembly includes a multi-junction thermopile 12. Use of a multi-junction thermopile provides a low cost sensor element. In the illustrated embodiment, the thermopile 12 is a model 2MC thermopile detector available from Dexter Research Center, 7300 Huron River Drive, Dexter, Mich. 43180. Other models are employed in alternative embodiments. The multi-junction thermopile 12 combines standard dissimilar metal thermocouple technology and thin film fabricating techniques to form two sets of series connected thermocouple junctions on a single ceramic substrate. One set, hidden from the heat source or target, forms the reference junction. The second set is covered with carbon black (black graphite), to increase infrared (IR) energy absorbency, and faces the target. The thermopile 12 has a windowed mounting can or case receiving the entire substrate, and the case is back filled with an inert gas, such as dry nitrogen.

The thermopile 12 has a generally a flat response over a large spectral range from visible light (0.4–0.6 microns) through very long IR (greater than 30 microns). To narrow the sensitivity to the desired range (e.g., 3–20 microns), the material for the window of the thermopile 12 is chosen to form a low pass filter to eliminate the visible light and near IR spectrum above 1 micron.

Infrared light falling on the junctions of the thermopile 12 creates heat that generates a voltage. This voltage is added to a voltage generated by the reference junction of the thermopile 12 to provide a thermopile output. The net voltage is proportional to the sum of the radiant energy landing on the thermopile 12. Using the above equations, the temperature of the target is proportional to the fourth power of the sensor voltage. If the sensor is permitted to only see the target and not the background IR radiation, the background temperature component can be set to zero. Because the equation now has only a single variable, all the constants can be simply multiplied and the temperature computed as follows:

$$T = K(V)^{-4} - 273$$

where

T is Temperature in Celsius;

K is $\epsilon\sigma\mu$ ($\epsilon\sigma$-see Spectral Radiant Emittance equation above);

$\mu$ is Responsivity in Volts/Watt; and

V is Voltage in Volts.

The thermopile 12 produces a very stable monotonic output but has several operating parameters that create problems in implementing a workable production sensor assembly. The most difficult problem to overcome is the thermopile's temperature coefficient (TC) of the responsitivity $\mu$. This phenomena is related to the tracking between the sensing and reference junctions. The maximum value for the temperature coefficient for the inexpensive thermopile employed is −0.47%/° C. The ambient temperature (to be distinguished from target temperature) to which the thermal sensor assembly 10 will be exposed is 10–50 degrees Celsius, in the illustrated embodiment. Therefore, the maximum variation in voltage output by the thermopile 12 is 18.8%. This directly affects the calculated target temperature. One might conclude that a simple measurement of the ambient temperature might allow a correction factor to be developed for any particular thermopile to compensate for the thermopile's temperature coefficient. In reality, the ambient temperature that must be known is the temperature of the reference junction located inside the package. The measurement of the temperature of the reference junction is complicated because the substrate of the thermopile 12 is thermally isolated from the case of the thermopile 12. Therefore, the thermopile 12 does not create voltage from energy conducted through the case. This case to substrate thermal resistance, plus the thermal capacitance of the substrate leads to a thermal time constant that is very difficult to measure. If the substrate were to heat up or cool down, either from absorbing target energy through the viewing window or through the case, it would be difficult to determine what the substrate temperature might be at any particular time. In fact, self heating from looking at a hot target becomes a significant problem if the thermal resistance from the substrate to the case does not permit the trapped heat to dissipate.

Although a thermopile is typically considered to be a voltage source with a very low series resistance, the multiple junction construction of the thermopile 12 results in a nominal source resistance of about 6000 ohms. This source resistance has a temperature coefficient of −0.2%/° C. which produces a change of 8% over the ambient range (10–50 degrees Celsius) in which the thermal sensor assembly 10 will operate. This change can create a significant error in and must be accounted for in any ambient condition.

A decision was made to ignore other correction factors such as resistor Johnson noise, because they are sufficiently small.

Because of the great difficulty to correct for ambient changes and self heating effects, a design decision was made to operate the thermopile 12 isothermally by placing the thermopile 12 in a heat sink (described below) that is kept at a constant operating temperature. A decision was also made to control the field of view of the thermopile 12, so that the thermopile will only see the target or the heat sink.

In the illustrated embodiment (FIG. 2), the sensor assembly 10 includes a housing 14 receiving the thermopile 12. In the illustrated embodiment, the housing 14 houses a circuit board 15 on which, in the illustrated embodiment, all electronic circuitry (described below) is supported. The housing 14 is made of plastic to reduce the affects of radiant heating. The housing 14 includes an opening 20. the sensor assembly 10 includes a pair of fuse clips 16 attached to the housing, and a heat sink 18 having opposite ends 34 and 36 supported by the fuse clips 16. The heat sink 18 supports the thermopile 12.

In the illustrated embodiment. the heat sink 18 is a bar or plate made out of thermally conductive metal, and has a bore 19 which closely receives the thermopile 12. The heat sink 18 is constructed of a metal selected to provide large specific heat and fast response time. In the illustrated embodiment, the heat sink is copper. The bore 19 is preferably a minimum clearance bore to provide minimum thermal resistance. The thermopile is supported in the housing by the heat sink 18 such that the first set of thermopile junctions (the window of the case of the thermopile 12) faces the opening 20 in the housing. The size of the bore 19 is selected to control the field of view of the thermopile 12 so that the thermopile 12 looks at an average between the target and the heat sink at the proper distance from the target. In the illustrated embodiment, the thermopile 12 is located between the opposite ends 34 and 36 of the heat sink 18, approximately mid-way between the opposite ends 34 and 36.

The temperature of the heat sink 18 is controlled. More particularly, the thermal sensor assembly further includes a fan 21 mounted in an opening in the housing and directing a cooling gas into the housing at a rate of between 1.08–1.18 cubic feet per minute (cfm). The fan 21 also blows air across a face of the thermopile 12 to keep it free of particulate contamination (e.g. such as toner contamination in a printer embodiment). Because the fan 21 supplies cooling gas (such as ambient air) at a temperature below the temperature of the target, there is always heat flow away from the heat sink. In a preferred embodiment, the fan 21 directs air into the housing at a rate of 1.13 cubic feet per minute. In the illustrated embodiment, the fan 21 is a 12 Volt fan 21, model AD0212HBG51 available from Advanced Technology Co., Vista, Calif. Other fans could be employed. The thermal sensor assembly 10 further includes a heater for heating the heat sink 18. In the illustrated embodiment, the heater includes two heat sources: a power resistor 24 and by a transistor 26 operating as a class A power output stage. The heat sources 24 and 26 are placed at opposite ends 34 and 36 of the heat sink 18 to distribute heat evenly. The temperature of the heat sink is controlled by a temperature controller (described below). The thermal sensor assembly 10 further includes a thermopile amplifier 28 (FIG. 4) coupled to the thermopile 12.

Isothermal operation solves many problems. Because the ambient temperature never changes the voltage output from the thermopile, circuitry such as the thermopile amplifier 28 can be calibrated for zero ambient temperature and span (gain) at test time. If a proper isothermal operating point is chosen, there will be little heat energy absorbed by the thermopile 12 from the target so self heating errors are reduced.

In one embodiment, two thermal sensors assemblies 10 are employed to measure the surface temperatures of two heated drums in a printer. One thermal sensor assembly 10 is employed to measure the temperature of an image drum which operates at about 55 degrees Celsius, and another thermal sensor assembly 10 is employed to measure the temperature of a fuse drum which operates at about 125 degrees Celsius.

A temperature of 55° C. was chosen for the isothermal operating point of the thermal sensor assembly 10, to match the image drum temperature. With a maximum system ambient of 50° C., the temperature controller for the heat sink always has a thermal sink available for proper operation. In 3 addition, the maximum differential between the fuse drum and the thermopile heat sink will be about 75° C., instead of 115° C. to low ambient temperature. This will reduce the heat flow from the fuse drum to the sensor. Other isothermal operating points can be chosen in other applications.

The output of the thermopile amplifier 28 is adjusted during calibration to fit the fourth power curve of the thermopiles output at two operating points: 1.0 volts at 55° C. and 5.0 volts at 140° C. for the printer application. An external Analog to Digital (A/D) converter (not shown) can be employed to convert the output of the thermopile amplifier 28 into an 8 bit (0–255 count) value. The 8 bit value produced by the A/D converter can be used by digital control systems. For example, in the printer embodiment, the 8 bit value is used to control heating and cooling devices to maintain the surface temperatures of the fuse drum and of the image drum at various operating points.

Figure 3:
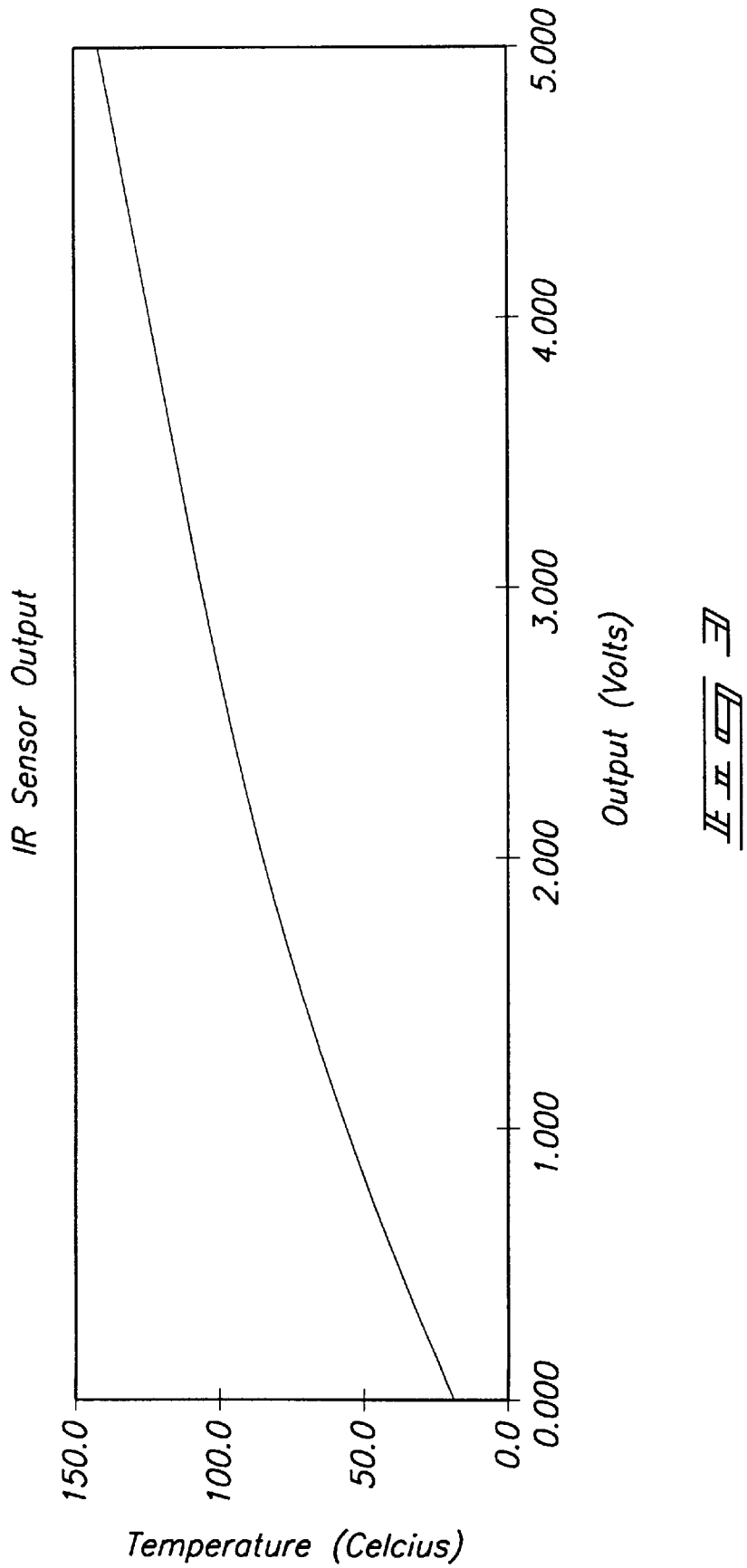
FIG. 3 is a plot of temperature versus output voltage of the thermal sensor assembly of FIG. 2.

FIG. 3 shows the nominal response curve of the calibrated thermal sensor assembly 10. Other applications are possible, in which the thermal sensor assembly is calibrated for other multiple operating points or for a single operating point.

The response curve, though a fourth power curve, is nearly linear over this short temperature span between the two operating points. Because the operating points of the two sensors used in the printer embodiment are early constant (55° C. for the image drum and 120–130° C. for the fuse drum), the small non-linear error is ignored. As long as the output is monotonic (no two temperature points have the same voltage) over the operating range, the temperature of the image drum and fuse drum can be accurately controlled near the end points. The 55° C. operating point was set at an offset of 1.0 Volt at the expense of some overall resolution so that a control system 136 (FIG. 6) which receives measured temperature from an A/D converter 138 can see temperature below a desired operating point. For example, in the printer embodiment, a control system for controlling drum temperature can see drum temperature below its operating point. The A/D converter 138 employed has a range of 0–5 volts. The adjustment at the two endpoints lumps all the Emittance constants into the calibration values. By using the appropriate surfaces for calibration targets at the appropriate endpoints (e.g., anodized image drum at 55° C., and rubber coated fuse drum at 140° C.), the emissivity of the targets will also be taken into account in the calibration.

Figure 4:
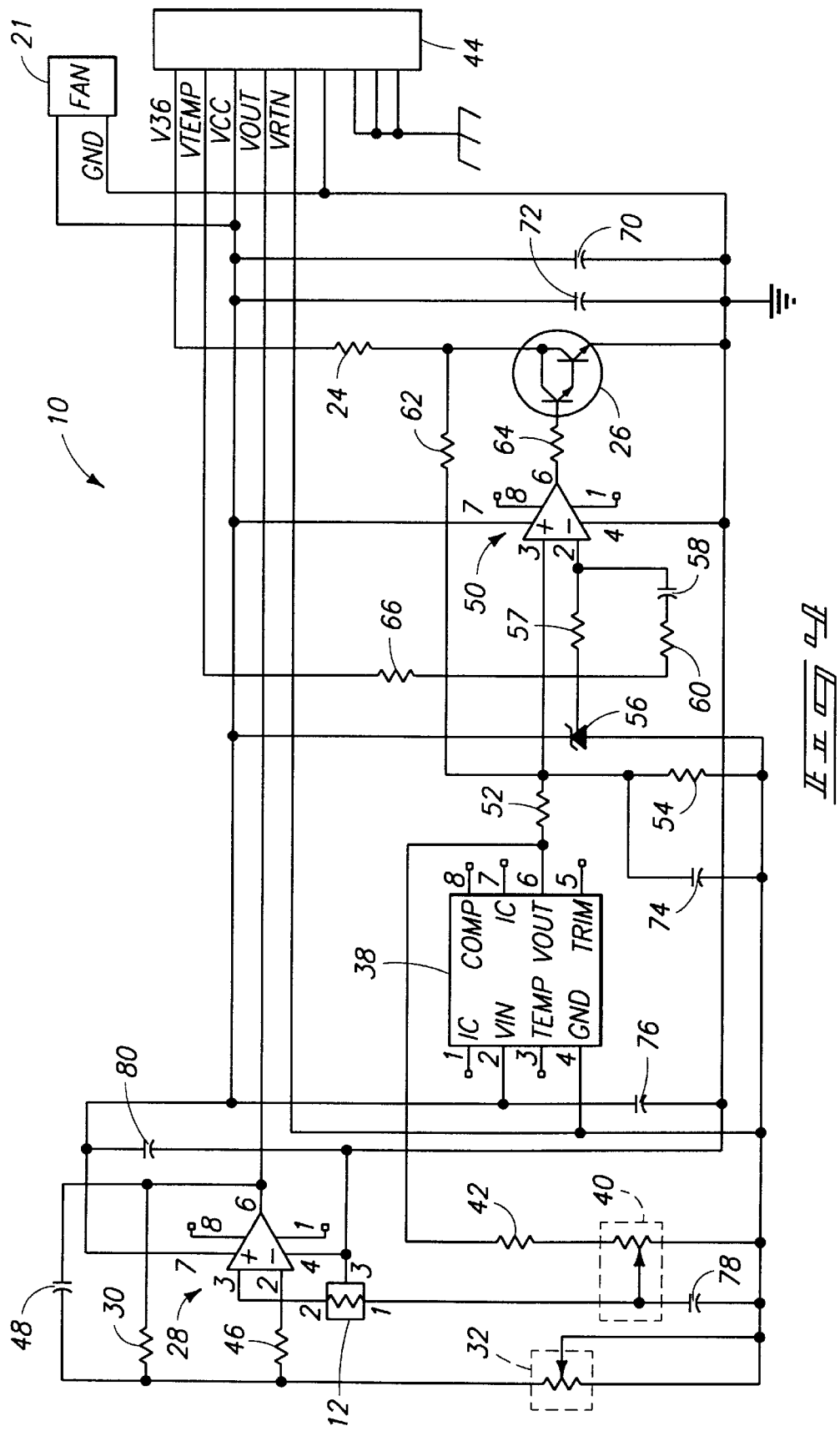
FIG. 4 is a circuit schematic of circuitry included the thermal sensor assembly of FIG. 2.

FIG. 4 is a circuit diagram of circuitry included in the thermal sensor assembly 10. The circuit implementation shown in FIG. 4 provides a single stand alone design that will operate in multiple applications (or multiple locations, such as in connection with an image drum and a fuse drum of a printer).

The assembly 10 further includes a reference voltage generator 38. In the illustrated embodiment, the voltage reference 38 is temperature compensated. More particularly, in the illustrated embodiment, the voltage reference 38 is a monolithic integrated circuit, REF02CN8, and is used to provide a stable offset set voltage for the thermocouple amplifier 28 and a reference for a heater error amplifier (described below). The voltage reference 38 is powered from an external regulated 12 Volt power supply (not shown), and the assembly 10 includes a connector 44, accessible from outside the housing 14, for coupling the voltage reference 38 to the 12 Volt power supply. The voltage reference 38 internally compensates for ambient temperature changes. Note, however, that the internal temperature of the sensor assembly 10 will tend to remain steady because of the heat sink heaters 24 and 26, so it may be possible to employ a voltage reference that is not temperature compensated, at the risk of some loss of accuracy.

In the illustrated embodiment, the amplifier 28 is a precision, high gain op-amp with extremely low offset voltage and bias currents. The op-amp is configured as a non-inverting amplifier. In the illustrated embodiment, the op-amp is a LT1077 integrated circuit. Other models could be employed. The assembly 10 includes a resistor 30 and a variable resistor 32 coupled to the amplifier 28 to set the gain of the amplifier. The variable resistor 32 defines a gain variable resistor, and is adjustable from outside the housing 14. In the illustrated embodiment, gain varies from 222 minimum to the open loop gain of the op-amp. The thermopile 12 is connected to the positive (non-inverting) input of the op-amp 28.

The assembly 10 further includes a resistor 46 coupled to the inverting input of the amplifier 28 and providing bias current balancing for the thermopile's bias current. The assembly 10 further includes a variable resistor 40, adjustable from outside the housing 14, and a resistor 42 in series with the variable resistor 40 and fed 5 Volts from the voltage reference 38. The variable resistor 40 is adjustable in a very low resistance range so that it does not contribute significantly to the source resistance of the thermopile. The variable resistor 40 provides a small offset voltage (0=10 mV) which is eventually multiplied by the amplifier 28. The variable resistor 40 defines an offset resistor used to establish the 55° C. 1.0 Volt operating point.

Because the offset resistor 40 is coupled to the gain, setting calibration of the amplifier at the two end points is a multiple step process. In operation, gain should first be set to the minimum value, then the offset established at 55° C. Next, the 140° C. operating point is set using the gain variable resistor 32. This will shift the offset position slightly which will require adjustment of the variable resistor 40 again. This process is repeated until both calibration points are reached. The assembly 10 further includes a capacitor 48 which reduces the AC gain of the amplifier 28 with a single corner at 70 Hz. The op-amp 28 is powered from a single rail regulated 12 Volt supply, such as the external power supply which is coupled to the connector 44. In the illustrated embodiment, all gain resistors are metal film for temperature stability.

The sensor assembly 10 includes an error amplifier 50 controlling the heating element 26 to keep the heat sink at a constant temperature. The absolute temperature setting is not critical but the thermal regulation must have very little ripple. In the illustrated embodiment, the amplifier 50 is a LT1077 integrated circuit, like the amplifier 28. The thermopile 12 is extremely sensitive to small transient changes in the ambient temperature that are an order of magnitude larger than the stated temperature coefficients. This phenomena is not documented by the manufacturer, but it appears to have a time constant of several seconds. If the ambient temperature (heat sink temperature) rises by one degree in one second, it will result in an apparent 10 degree shift, reflected in the output voltage of the sensor assembly 10. The shift will return to stable quiescent condition in 10–20 seconds but this is far to long a delay for the intended application. Any excessive regulation ripple appears as a large false AC component to the target temperature and would cause instability in thermal control systems that receive temperature information from the sensor assembly 10.

The nominal operating point of the heat sink is 55° C. which is high enough to keep it above maximum ambient and below the operating point of the semiconductor components used. The assembly 10 includes an error amplifier reference for the error amplifier 50. The error amplifier reference includes a voltage divider defined by resistors 52 and 54 coupled to the voltage reference 38 and having a voltage tap coupled to the non-inverting input of the amplifier 50. The voltage divider generates 0.552 Volts from the voltage reference 38. The assembly 10 further includes a sensor to determine the temperature of the heat sink 18. In the illustrated embodiment, the sensor that determines the temperature of the heat sink 18 is a temperature probe 56. While other temperature probes can be used, the temperature probe 56 is a LM35 semiconductor temperature probe with an output of approximately 10 mV/° C. or 0.55 Volts output at 55° C. In the illustrated embodiment, the temperature probe 56 is mounted in the housing 14 such that it is held tightly against the heat sink 18, close to the thermopile 12, to minimize thermal delay. The assembly 10 further includes a resistor 57 coupled between a non-inverting input of the error amplifier 50 and the output of the temperature probe 56.

Heating current for the power resistor 24 and the power stage 26 is provided by an external high voltage source (not shown), such as a 36 Volt nominal power supply coupled to the connector 44. In the illustrated embodiment, the 36 Volt power supply is unregulated. The power resistor 24 is used to limit the maximum power dissipation in the power stage 26 at high line voltage and permits heat to be distributed over the surface of the heat sink 18.

The temperature probe 56 has a slow response time (4 second time constant). This slow response time, coupled with the physical limits of heat flow in the heat sink 18, results in an extremely large phase shift between applied power and the rate of heat sink temperature change. With such a large delay, stability of the error amplifier 50 requires large phase compensation (feedforward) to prevent oscillations that would create ripple in the temperature of the heat sink 18. The assembly 10 includes a series connected capacitor 58 and resistor 60 providing high AC gain to the error amplifier 50. The capacitor 58 is a very low ESR capacitor having a low series resistance, so that series resistance and leakage do not significantly affect circuit operation. The assembly 10 further includes a resistor 62 which provides a small amount of DC negative feedback to improve stability around the operating point. The assembly 10 further includes a resistor 64 coupled between the output of the error amplifier 50 and the control electrode of the power stage 26. The resistor 64 reduces the overall DC gain by requiring the error amplifier 50 to provide a wider output swing. By reducing the overall DC loop gain, stability is improved because the loop gain will fall below unity before the total phase shift reaches a critical value. In one embodiment, the temperature probe 56 has an output routed to a test pin (not shown) on the connector 44. The assembly 10 further includes a resistor 66 coupled between the test pin and the resistor 60. The resistor 66 is provided so that the output of the temperature probe 56 is not loaded down by the test fixture. The assembly 10 further includes power supply bypassing capacitors 70, 72, 74, 76, 78, and 80.

Figure 5:
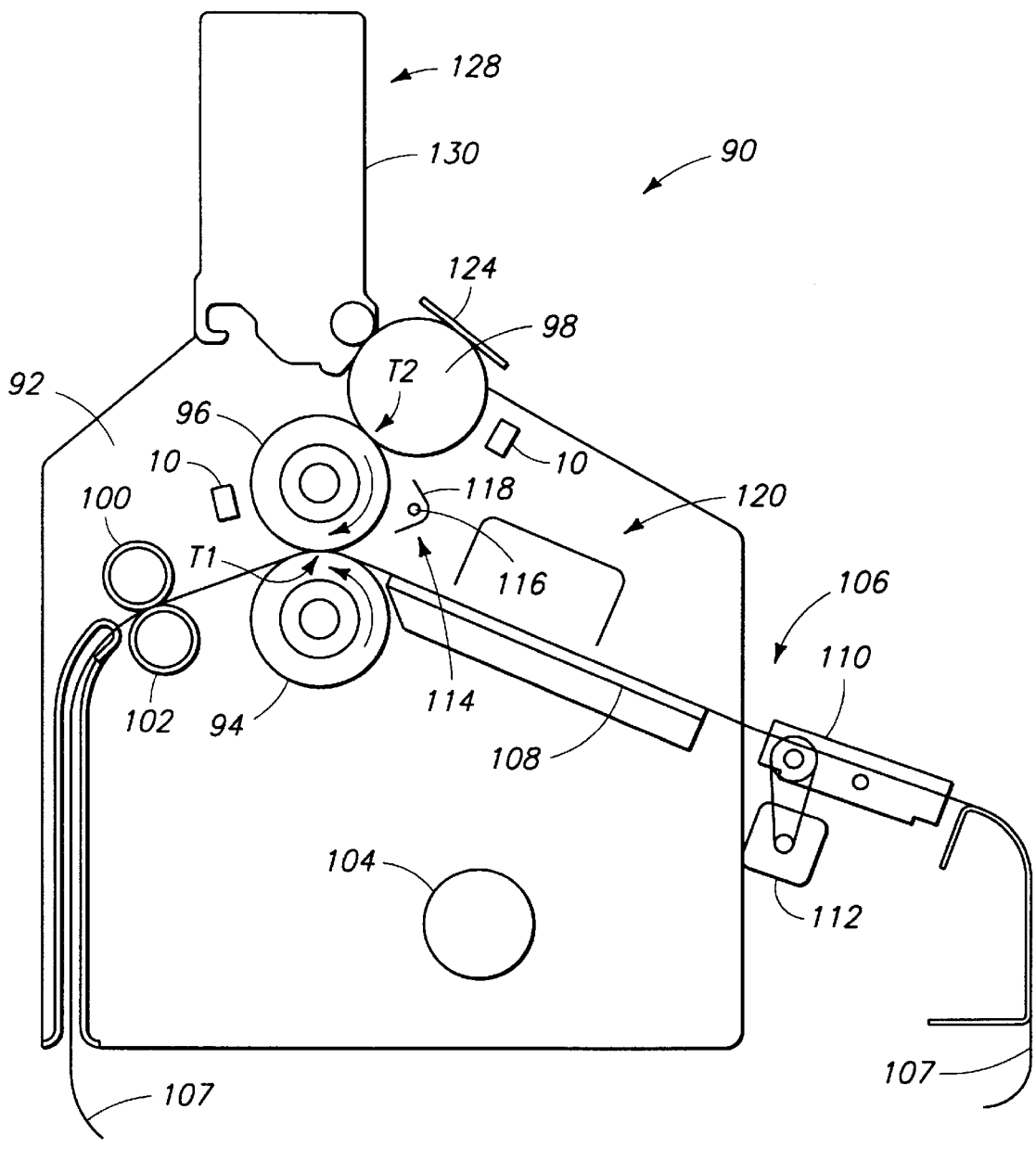
FIG. 5 is a side view of a printer, showing one possible application for the thermal sensor assembly of FIG. 2.

FIG. 5 illustrates use of the sensor assembly 10 in a printer 90. The printer 90 includes a frame 92. The frame 92 has two discreet sections, only one of which is shown in the drawings, it being understood that the opposite section of the frame, which is spaced therefrom, will be substantially a mirror image of same.

The printer 90 further includes a plurality of drums supported by the frame 92 relative to one another for rotation about parallel axes. In this regard, the frame 92 mounts a first or pressure drum 94, a second or fusing drum 96, and a third or image drum 98 placed into contact with the fusing drum 96. The printer 90 further includes exhaust drums 100, and 102 supported by the frame in spaced relationship relative to the first or pressure drum 94. The respective first, second, and third drums have engagement areas or nips which are designated as $T_1$ and $T_2$. respectively. The amount of pressure existing in the nip $T_1$ is normally about 100 lbs per square inch and the amount of pressure in nip $T_1$ is about 200 lbs per square inch. This nip pressure may be adjusted. Further, the individual nips ($T_1$ and $T_2$) may be selectively opened in one embodiment. In addition to the foregoing, each of the respective drums 94, 96, and 98 are maintained at controlled temperatures by heating or cooling devices. The printer 90 includes a motor 104 and a drive belt (not shown) coupling the motor 104 to the third or image drum 98. The image drum 98 drives the drums 94 and 96.

The printer 90 further includes a media or substrate engagement assembly 106 secured on the frame 92. The media engagement assembly 106, as a general matter, is operable to direct a substantially continuous substrate or media along a given path of travel into contact with the first or pressure drum 94 such that it is carried or otherwise received in the nip $T_1$. The media engagement assembly 106 has a support member 108 which has an upwardly facing surface which supports the media which is to be printed. The media engagement assembly further includes an infeed assembly, or media propulsion assembly 110, such as a conventional tractor assembly, mounted on the frame 92. The tractor assembly includes a motor 112.

The printer 90 further includes a first heating assembly 114 comprising an infrared lamp 116 and a reflector 118 borne by the frame 92 and disposed in heat transferring relation relative to the second or fusing drum 96. The first heater assembly is operable to maintain the fusing drum 96 at a temperature of less than about 130° C. This heat energy subsequently melts toner which adheres to the fusion drum thereby reducing it to a tar-like consistency.

The printer 90 further includes a second heating assembly 120 mounted on the frame 92 and disposed in spaced, heat transferring relation relative to the support member 108. The second heating assembly 120 is operable to impart heat energy to the media traveling nearby, thereby increasing its temperature. The second heating assembly 120 is employed when using substrates which have high thermal absorption capacities. This heater imparts heat energy to the substrate in order to prevent melted toner from losing too much heat energy too quickly to the substrate thereby interfering with the resulting toner fuse quality.

The printer 90 further includes an image forming assembly 124 of conventional design mounted operatively adjacent the third or image drum 98. The image forming assembly 124 includes a print cartridge. A commercially available image forming assembly may be secured from the Delphax Systems, Inc of Mississaugua, Ontario, Canada. As a general matter, the image forming assembly 124 works in combination with the third or image forming drum to electrostatically form a predetermined image thereon. The process of forming an image by this means is discussed in detail in prior art references dealing with electrostatic printers.

The printer 90 further includes a toner dispensing assembly 128 which is releasably mounted in a given operational orientation relative to the frame 92. The toner dispensing assembly 128 has a main body 130 which defines a storage cavity which receives a given amount of toner to be dispensed.

Figure 6:
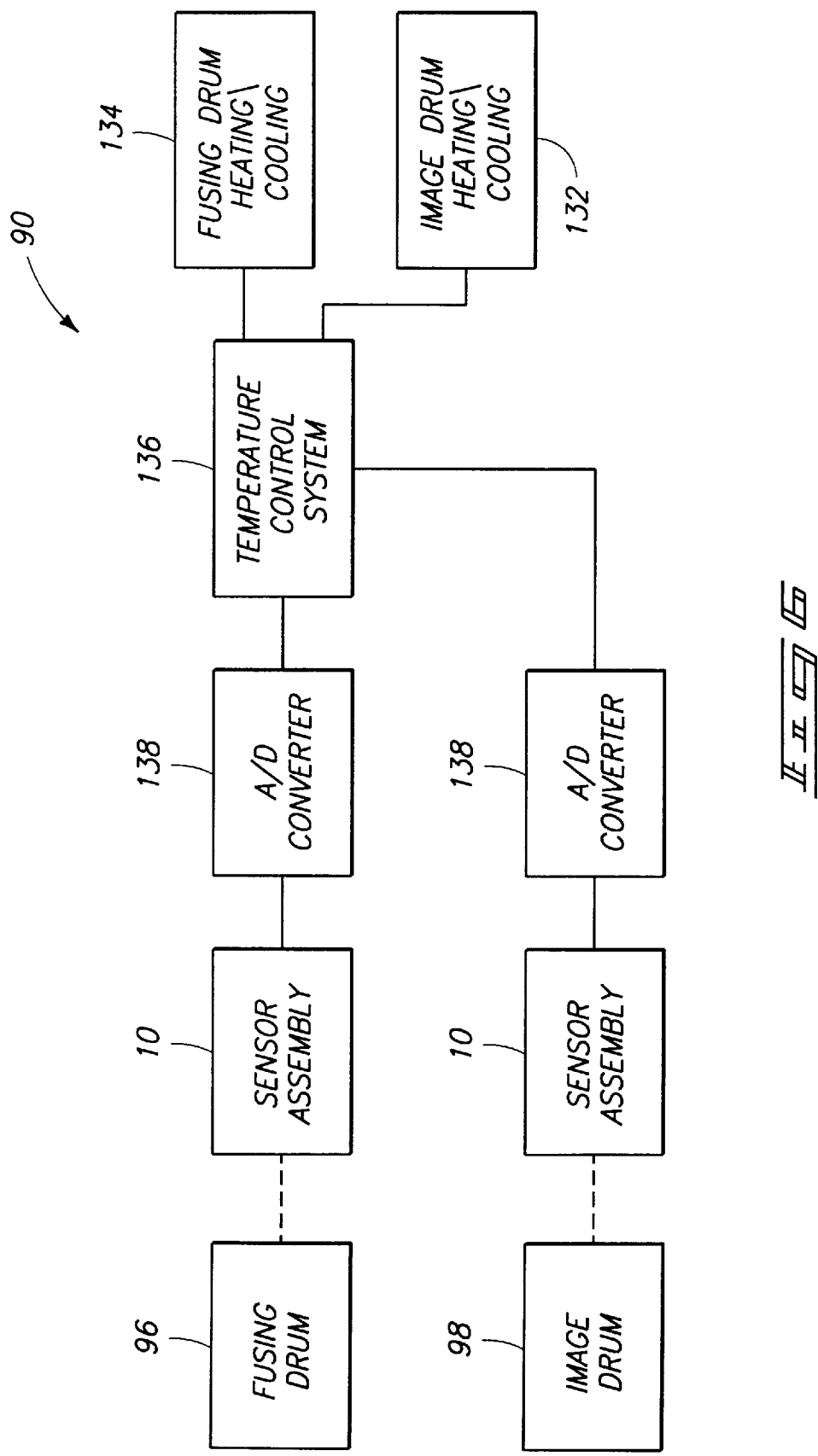
FIG. 6 is a block diagram of circuitry employed in the printer of FIG. 5.

The temperature sensors 10 are individually mounted in heat sensing relation relative to the second and third rotatable drums 96 and 98. The temperature sensors are utilized to control the temperature of both drums as shown in FIG. 6. The image drum 98 is maintained ideally at a temperature of less than about 70° C. Further, the fusing drum 96 is maintained at a temperature of less than about 130° C. Assemblies 132 and 134 to maintain these operational temperatures, and which are well known in the art, are connected in heat transferring, or cooling relation relative to the respective drums. More particularly, the printer 90 includes A/D converters 138 coupled to respective sensor assemblies 10 directed at the fusing drum 96 and image drum 98, respectively. The printer 90 further includes a temperature control system 136, which receives signals from the sensors 10, via the respective A/D converters, 138 and which controls the assemblies 132 and 134 appropriately by comparing sensed temperatures with desired temperatures.

In operation, the assembly 10 is supported with the opening 20 facing a target. Gain is first be set to the minimum value, then the offset established at a first operating point, e.g. 55° C. Next, the second operating point (e.g., 140° C.) is set using the gain variable resistor 32. This will shift the offset position slightly which will require adjustment of the variable resistor 40 again. This process is repeated until both calibration points are reached. The output voltage, representative of temperature, can then be converted from an analog value to a digital value.

To better enable one of ordinary skill in the art make and use the invention, sample component values will be provided by way of example only, it being understood that other values can be employed in accordance with the invention.

| Component | Exemplary Value |
|---|---|
| 24 | 200 Ω |
| 30 | 22.1 kΩ |
| 32 | 100 Ω (variable) |
| 40 | 100 Ω (variable) |
| 42 | 47.5 kΩ |
| 46 | 6.19 kΩ |
| 48 | 0.1 μF |
| 52 | 47.5 kΩ |
| 54 | 5.90 kΩ |
| 57 | 22 kΩ |
| 58 | 470 μF |
| 60 | 47 Ω |
| 62 | 10 MΩ |
| 64 | 22 kΩ |
| 66 | 2 kΩ |
| 70 | 10 μF |
| 72 | 0.1 μF |
| 74 | 0.1 μF |
| 76 | 0.1 μF |
| 78 | 0.1 μF |
| 80 | 0.1 μF |

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An electrostatic printer comprising:

a frame;

a pressure drum supported by the frame for rotation about a first axis;

an image drum supported by the frame for rotation about a second axis parallel to the first axis;

a fusing drum supported by the frame for rotation about a third axis parallel to the first axis, the fusing drum being, in operation, configured to counter-rotate against the image drum, the pressure drum being, in operation, configured to counter-rotate against the fusing drum;

a toner dispensing assembly supported by the frame and disposed to dispense toner to the image drum; and an infrared thermal sensor assembly disposed to sense the temperature of one of the drums, the sensor assembly including a housing having an opening therethrough, a circuit board supported by the housing, a heat sink supported by the circuit board, the heat sink having opposite ends and having a bore therethrough between the opposite ends, a thermopile housed in the bore and facing the opening in the housing, a first heater element supported by the circuit board, proximate one of the ends of the heat sink, and operative to heat the heat sink, a second heater clement supported by the circuit board, proximate another of the ends of the heat sink, and configured to heat the heat sink, and a fan supported by the circuit board and configured to direct gas into the housing, and out of the housing through the opening.

2. An electrostatic printer in accordance with claim 1 wherein the first heater element comprises a power resistor supported by the circuit board, and wherein the second heater element comprises a power output stage supported by the circuit board and electrically coupled to the power resistor.

3. An electrostatic printer in accordance with claim 1 and further comprising first and second spaced apart fuse clips mounted to the circuit board, wherein the first fuse clip supports one of the ends of the heat sink, and the second fuse clip supports the other end of the heat sink.

4. An electrostatic printer in accordance with claim 1 wherein the bore includes a large diameter portion receiving the thermopile, and a small diameter portion aligned with the large diameter portion, and wherein the thermopile faces the target through the small diameter portion.

5. An electrostatic printer in accordance with claim 1 and further comprising a temperature probe operative to sense the temperature of the heat sink, and circuitry coupled to the temperature probe and to the first and second heater elements to control the temperature of the heat sink.

6. An electrostatic printer in accordance with claim 5 wherein the circuitry coupled to the temperature probe and to the first and second heater elements to control the temperature of the heat sink comprises an error amplifier.

7. An electrostatic printer in accordance with claim 5 wherein the first and second heating elements are configured to heat the heat sink in response to having power applied to the first and second heating elements, and wherein the circuitry coupled to the temperature probe and to the first and second heater elements to control the temperature of the heat sink comprises a phase compensator to compensate for delay between applying power to the first and second heating elements and temperature change of the heat sink sensed by the temperature probe.

8. An electrostatic printer in accordance with claim 1 and further comprising adjustable circuitry, accessible from outside the housing, usable to calibrate the sensor assembly for operation relative to two different temperature operating points.

9. An electrostatic printer comprising:

a frame;

a pressure drum supported by the frame for rotation about a first axis;

an image drum supported by the frame for rotation about a second axis parallel to the first axis;

a fusing drum supported by the frame for rotation about a third axis parallel to the first axis, the fusing drum being, in operation, disposed to counter-rotate against the image drum, the pressure drum, in operation, being disposed to counter-rotate against the fusing drum;

a heating assembly configured to heat the fusing drum; and an infrared thermal sensor assembly for sensing the temperature of the fusing drum, the sensor assembly including:

a housing having an opening therethrough;

a circuit board supported by the housing;

a heat sink supported by the circuit board, the heat sink having opposite ends and having a bore therethrough between the opposite ends, the bore including a first portion, having a first diameter, receiving the thermopile, and a second portion having a second diameter less than the first diameter, the second portion being aligned with the first portion;

a multi-junction thermopile housed in the first portion of the bore and facing the opening in the housing through the second portion, whereby the field of view of the thermopile is controlled;

a first heater element supported by the circuit board, proximate one of the ends of the heat sink, and operative to heat the heat sink in response to having power applied to the first heater element, the first heater element including a power resistor supported by the circuit board;

a second heater element supported by the circuit board, proximate another of the ends of the heat sink, and configured to heat the heat sink in response to having power applied to the second heater element, the second heater element including a power output stage supported by the circuit board and electrically coupled to the power resistor;

a temperature probe operative to sense the temperature of the heat sink;

circuitry coupled to the temperature probe and to the first and second heater elements to control the temperature of the heat sink, the circuitry including an error amplifier and a phase compensator to compensate for delay between applying power to the first and second heating elements and temperature change of the heat sink sensed by the temperature probe; and a fan supported by the circuit board and configured to direct gas into the housing, and out of the housing through the opening.

10. An electrostatic printer in accordance with claim 9 and further comprising first and second spaced apart fuse clips mounted to the circuit board, wherein the first fuse clip supports one of the ends of the heat sink, and the second fuse clip supports the other end of the heat sink.

11. An electrostatic printer in accordance with claim 9 and further comprising adjustable circuitry, accessible from outside the housing, coupled to the first mentioned circuitry, and usable to calibrate the sensor assembly for operation relative to different temperature operating points.

12. An electrostatic printer comprising:

a frame;

a pressure drum supported by the frame for rotation about a first axis;

an image drum supported by the frame for rotation about a second axis parallel to the first axis;

a fusing drum supported by the frame for rotation about a third axis parallel to the first axis, the fusing drum being, in operation, disposed to counter-rotate against the image drum, the pressure drum, in operation, being disposed to counter-rotate against the fusing drum to define a nip;

a support member supported by the frame and configured to direct a continuous printable media to the nip;

a toner dispensing assembly supported by the frame and disposed to dispense toner to the image drum;

an image forming assembly disposed to operate on toner dispensed on the image drum to form an image, the imaging drum being configured to transfer the image to the fusing drum, the fusing drum being configured to transfer the image to the continuous printable media;

a heating assembly configured to heat the fusing drum; and an infrared thermal sensor assembly for sensing the temperature of the fusing drum, the sensor assembly including:

a housing having an opening therethrough;

a circuit board supported by the housing;

first and second spaced apart clips mounted on the circuit board;

a heat sink supported from the circuit board by the clips, the heat sink having opposite ends and having a bore therethrough between the opposite ends, the bore including a first portion, having a first diameter, and a second portion having a second diameter, less than the first diameter, the second portion being aligned with the first portion;

a thermopile housed in the first portion of the bore and facing the opening in the housing through the second portion;

a first heater element supported by the circuit board, proximate one of the ends of the heat sink, and operative to heat the heat sink in response to having power applied to the first heater element, the first heater element including a power resistor supported by the circuit board;

a second heater element supported by the circuit board, proximate another of the ends of the heat sink, and configured to heat the heat sink in response to having power applied to the second heater element, the second heater element including a power output stage supported by the circuit board and electrically coupled to the power resistor;

a temperature probe operative to sense the temperature of the heat sink;

temperature control circuitry coupled to the temperature probe and to the first and second heater elements to control the temperature of the heat sink, the temperature control circuitry including an error amplifier and a phase compensator to compensate for delay between applying power to the first and second heating elements and temperature change of the heat sink sensed by the temperature probe;

adjustable circuitry, accessible from outside the housing, coupled to the temperature control circuitry, and usable to calibrate the sensor assembly for operation relative to different temperature operating points and;

a fan supported by the circuit board and configured to direct gas into the housing, and out of the housing through the opening.

* * * * *

UNITED STATES PATENT AND TRADEMARK OFFICE
CERTIFICATE OF CORRECTION

PATENT NO. : 5,999,768

DATED : December 7, 1999

INVENTOR(S) : John Gillen and Robert Casper

It is certified that error appears in the above-identified patent and that said Letters Patent is hereby corrected as shown below:

Column 1, line 34, replace "$W_{80}=C_1)/\lambda^5(e^{C2/\lambda T}-1))$" with --$W_\lambda = C_1/(\lambda^5(e^{C2/\lambda T}-1))$--.

Column 6, line 3, delete "3".

Column 9, line 6, replace "include s" with --includes--.

Column 9, line 12, replace "$T_1$" with --$T_2$--.

Signed and Sealed this

Fifth Day of December, 2000

Attest:

Attesting Officer

Q. TODD DICKINSON

Director of Patents and Trademarks